United States Patent
Paradise

(10) Patent No.: US 8,590,309 B2
(45) Date of Patent: Nov. 26, 2013

(54) APPARATUS AND METHOD FOR SEPARATING ICE FROM FUEL IN A GAS TURBINE ENGINE

(75) Inventor: Bruce Paradise, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 59 days.

(21) Appl. No.: 13/225,697

(22) Filed: Sep. 6, 2011

(65) Prior Publication Data

US 2013/0055723 A1   Mar. 7, 2013

(51) Int. Cl.
*F02C 1/00* (2006.01)
*F02G 3/00* (2006.01)

(52) U.S. Cl.
USPC ....... 60/734; 60/39.092; 60/39.093; 210/773; 210/787; 210/788; 210/512.1

(58) Field of Classification Search
USPC .......... 60/734, 39.091–39.094; 210/773, 787, 210/788, 512.1
See application file for complete search history.

(56) References Cited

U.S. PATENT DOCUMENTS

| 6,440,317 B1 * | 8/2002 | Koethe | 210/774 |
| 8,221,633 B2 * | 7/2012 | Lam | 210/788 |

FOREIGN PATENT DOCUMENTS

WO    WO2010103305 A2    9/2010

OTHER PUBLICATIONS

European search report dated Jan. 31, 2013 for Application No. EP 12183291.

* cited by examiner

*Primary Examiner* — Gerald L Sung
*Assistant Examiner* — Craig Kim
(74) *Attorney, Agent, or Firm* — Cantor Colburn LLP

(57) ABSTRACT

According to one aspect of the invention, an ice separating apparatus for a gas turbine engine includes a can having a first end and a tangential inlet proximate the first end of the can to receive a fluid flow within the can, wherein the fluid flow includes fuel and ice. The apparatus also includes a first conduit within the can to receive a separated fuel flow proximate a second end of the can, wherein the fluid flow separates ice from fuel to form the separated fuel flow.

16 Claims, 2 Drawing Sheets

APPARATUS AND METHOD FOR SEPARATING ICE FROM FUEL IN A GAS TURBINE ENGINE

BACKGROUND OF THE INVENTION

The subject matter disclosed herein relates to gas turbine engines and, more particularly, to an apparatus and method for separating ice and water from fuel in gas turbine engines.

In a gas turbine engine, chemical energy of a fuel is converted into thermal energy. The fuel may be directed from a suitable receptacle, such as a fuel tank, to the engine. In cases where the gas turbine engine is located in an aircraft, a fuel tank can be located in the wings of the plane. To account for changes in temperature and/or pressure, the tank has a breather line or vent. In some situations, moisture can accumulate in the tank through the vent and the moisture can freeze into ice when the tank is exposed to cold conditions, such as when flying at altitude. Ice particles may accumulate in the tank and then break away and may be drawn into the fuel circuit during operation. In some cases, large amounts of ice flow with the fuel from the tank into the gas turbine engine and may interrupt or adversely affect performance of the gas turbine engine.

BRIEF DESCRIPTION OF THE INVENTION

According to one aspect of the invention, an ice separating apparatus for a gas turbine engine includes a can having a first end and a tangential inlet proximate the first end of the can to receive a fluid flow within the can, wherein the fluid flow includes fuel and ice. The apparatus also includes a first conduit within the can to receive a separated fuel flow proximate a second end of the can, wherein the fluid flow separates ice from fuel to form the separated fuel flow.

According to another aspect of the invention, a method for separating ice and fuel in a gas turbine engine includes flowing a fluid tangentially into a first end of a can, wherein the fluid includes fuel and ice and separating the ice from the fuel by flowing the fluid along a helical pattern as it flows to a second end of the can. The method also includes receiving a separated fuel flow in a first conduit disposed within the can and directing a water flow from proximate the second end of the can to an outlet of the first conduit.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
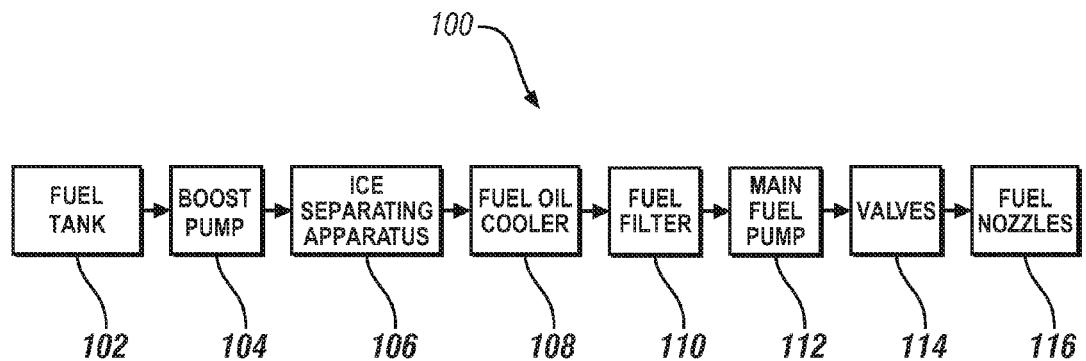
FIG. 1 is a block diagram of an exemplary fuel circuit for a gas turbine engine.

FIG. 1 is a block diagram of an exemplary fuel circuit 100 that may form part of a gas turbine engine. The gas turbine engine may be for aircraft use or ground based stationary use, such as for an electrical power plant. In the example shown in FIG. 1, the fuel circuit 100 shows blocks or components included in an exemplary fuel flow path for the gas turbine for use in an aerospace application. The fuel is stored in a tank 102. The tank 102 can optionally be located in an aircraft wing. The fuel is directed from the fuel tank 102 in the wing into a boost pump 104, where it then flows into an ice separating apparatus 106. As described in detail below, the ice separating apparatus 106 is configured to separate higher density matter, such as ice and liquid water, from the fuel (which has lower density than water/ice), thereby preventing potential blockage of the fuel system with ice, which may adversely affect engine operation. After the fuel leaves the ice separating apparatus 106, a fuel oil cooler 108 performs a heat exchange between the engine oil and the fuel, wherein the oil is cooled and the fuel is heated. The heated fuel then has contaminants removed by fuel filter 110 to prevent system contamination. Next, the fuel is directed to the main fuel pump 112, where it is pumped to valves 114 and, ultimately, delivered by fuel nozzles 116 into one or combustors or combustion chambers. As depicted, the fuel circuit 100 is configured to direct, condition and/or treat fuel as it flows from the fuel tank 102 into the engine for combustion. The ice separating centrifuge apparatus 106 is configured to improve fuel flow to the engine and reduce interruptions or blockages in the fuel circuit 100 caused by matter, such as ice, accumulating and/or contaminating the fuel.

As used herein, "downstream" and "upstream" are terms that indicate a direction relative to the flow of working fluid through the apparatus. As such, the term "downstream" refers to a direction that generally corresponds to the direction of the flow of working fluid, and the term "upstream" generally refers to the direction that is opposite of the direction of flow of working fluid. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis.

Figure 2:
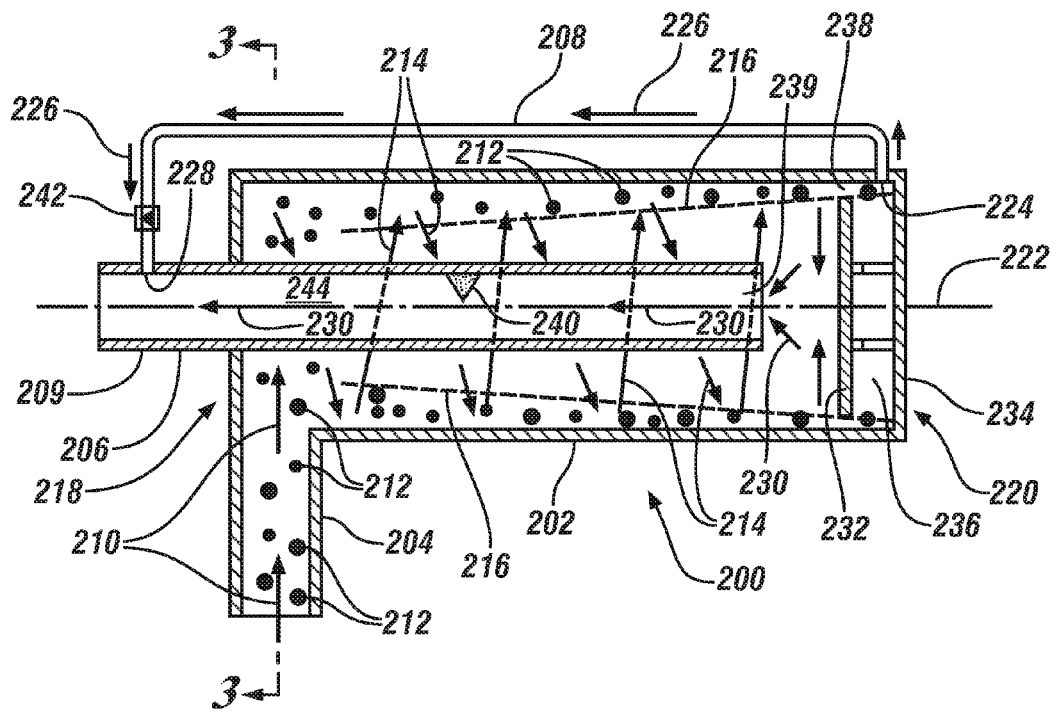
FIG. 2 is a sectional side view of an exemplary fuel separating apparatus for use in the fuel circuit of FIG. 1.

FIG. 2 is a sectional side view of an exemplary ice separating apparatus 200 (also referred to as "ice separating centrifuge" or "ice separating centrifuge apparatus") to be placed in a gas turbine fuel circuit, such as the circuit shown in FIG. 1. It should be understood that the ice separating apparatus 200 can be the same as the ice separating apparatus 106 of FIG. 1. The ice separating apparatus 200 includes a can 202 that receives a fluid flow 210 via a tangential inlet 204. As depicted, a conduit 206 (also referred to as "fuel conduit") is positioned within the can 202, wherein the conduit 206 and can 202 are disposed and substantially centered about an axis 222. In an embodiment, an external conduit, such as conduit 208, is configured to direct fluid from a portion of the can 202 to an outlet 209 of the conduit 206. The fluid flow 210 includes water 212, frozen and/or in liquid form, along with fuel for operation of the gas turbine engine. The fluid flow 210 is received tangentially within the can 202 and flows axially from a first end 218 to a second end 220 of the fuel separating apparatus 200. The fluid flows in a helical pattern as indicated by arrows 214 as it flows from the first end 218 to the second end 220. As the fluid flows 210 from the first end 218 to the second end 220, higher density matter (relative to density of the fuel), such as frozen and liquid water 212, moves radially outward, toward an inner diameter of the can 202. The radial outward movement is illustrated by a cone 216 which expands in a radial direction from the first end 218 to the second end 220.

The water 212 travels to the second end 220 and liquid water is directed into the conduit 208 via inlet 224. In embodiments, frozen water accumulates in a cavity 236 wherein the frozen water (ice) is melted into liquid water over time. The liquid water is then directed through the inlet 224. In an embodiment, the frozen water melts due to higher temperature of the apparatus due to its location within the gas turbine system. A fluid or liquid water flows (as indicated by arrows 226) through the outlet 228 to the fuel conduit outlet 209. The liquid water flow 226 joins a fuel flow 230, wherein the fuel flow 230 and water flow 226 are mixed or combined as they are directed to a downstream fuel component, such as the fuel oil cooler 108 of FIG. 1. In an embodiment, the fuel flow 230 is substantially entirely fuel, wherein the ice and water 212 (also referred to as "ice", "frozen water" or "water/ice") is separated as it is directed toward the can 202 circumference as it flows towards the second end 220. In some cases, the ice and water 212 comprises substantially ice, and, in other cases, the ice and water 212 comprises a mixture of ice and water. As depicted, a platform 232 extends from a wall 234 to form a cavity to receive the ice and water 212 as it flows through a circumferential passage 238 toward the second end 220. The circumferential passage 238 is a passage formed circumferentially between the wall of the can 202 and the platform that allows fluid flow downstream. Due to centrifugal force caused by the flow (such as helical flow 214) and the relative higher density of ice and water 212 compared to fuel 230, the ice and water 212 flows radially outward to the circumference of the can 202 as a fuel conduit inlet 239 receives the fuel flow 230, which is substantially separated from the ice and water 212.

The ice and water 212 is collected at the second end 220 of the can 202 where the ice melts over time due to elevated temperatures proximate the accumulated ice. Such elevated temperatures may be a result turbine operation, such as a hot exhaust gas flow proximate the can 202. The water collected at the second end 220, including originally liquid water and/or melted ice, is reintroduced as liquid water flow 226 into the fuel flow 230 to the turbine engine at a controlled rate. Thus, in an embodiment, the fuel separating apparatus 200 separates ice, melts the ice and reintroduces it as liquid water flow 226 to the fuel flow 230. In embodiments, the fuel separating apparatus 200 may receive substantially entirely liquid fuel and water during a majority of operational time and may be used to separate ice from fuel after an occasional release of ice from the fuel tank.

Still referring to FIG. 2, flow of fluid into the inlet 224 of conduit 208 is caused by centrifugal forces and pressure buildup as the flow (e.g. helical flow 214) terminates in the wall 234. In an embodiment, the liquid water 226 may also be drawn through the conduit 208 by a pressure change caused by the fuel flow 230 downstream over a restriction 240. The restriction 240 is an example of a flow control member that causes a pressure drop downstream of the restriction 240, specifically in a region 244 proximate the fuel conduit outlet 209. The lower pressure of region 244 which causes the liquid water flow 226 from the higher pressure conduit 208 into the fuel conduit 206. In embodiments, the liquid water flow 226 into the fuel flow 230 may be regulated or controlled by a restrictor 242 located in the conduit 208. Embodiments of the ice separating apparatus 200 may include any suitable arrangements to control liquid water flow 226 and/or fuel flow 230, such as the restriction 240, restrictor 242 or a combination thereof.

The can 202 may be any suitable shape for receiving flow to cause a flow, such as a helical flow, wherein exemplary shapes include a substantially cylindrical or multi-sided geometry. The diameter of the can 202 may be adjusted depending on the desired centrifugal forces to cause separation of high density matter from the fuel. An exemplary can 202 may have a diameter to cause a centrifugal force of between 5 and 20 G's for the flowing fluid. Further, the axial length of the can 202 may also be altered based on a dwell time for the high density matter (e.g., ice, water) to propagate towards the wall of the can. The fuel conduit 206 may be any suitable shape including a passage for receiving fluid flow proximate the axis 222 within the can 202. The exemplary fuel conduit 206 is substantially cylindrical. The conduit 208 may be internal or external to the can and is configured to provide a separate flow path to the fuel conduit from the can 202. The platform 232 is any suitable geometry to restrict or redirect flow from the flow 214 proximate the axis 222 into the fuel conduit inlet 239 while allowing circumferential flow of higher density matter (ice, liquid water, etc.) about the platform to the inlet 224 of conduit 208.

Figure 3:
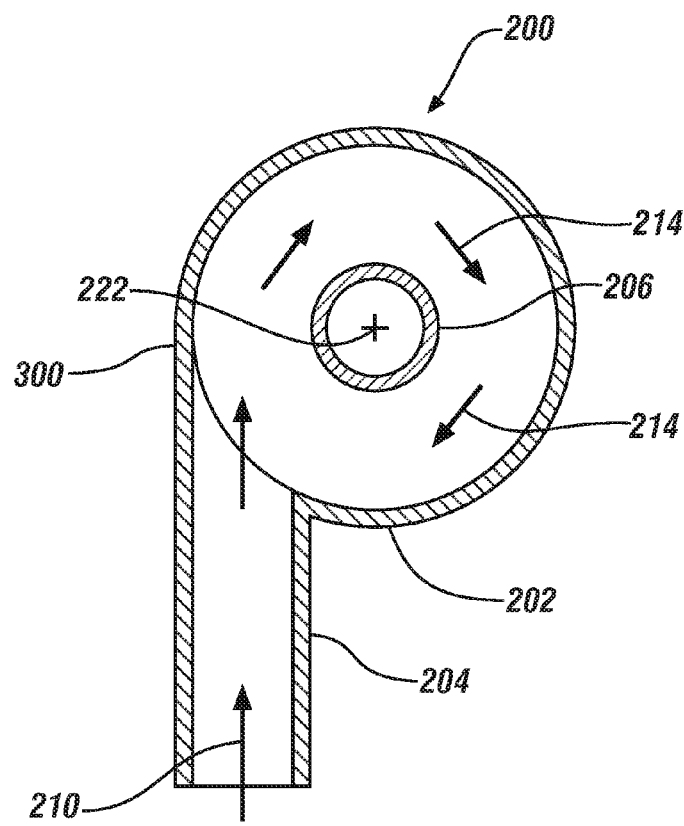
FIG. 3 is a sectional end view of the fuel separating apparatus of FIG. 2.

FIG. 3 is a sectional side view of a portion of the ice separating apparatus 200. As depicted, a tangential entry 300 of the inlet 204 enables the helical flow 214 of the fluid within the can 202.

Figure 4:
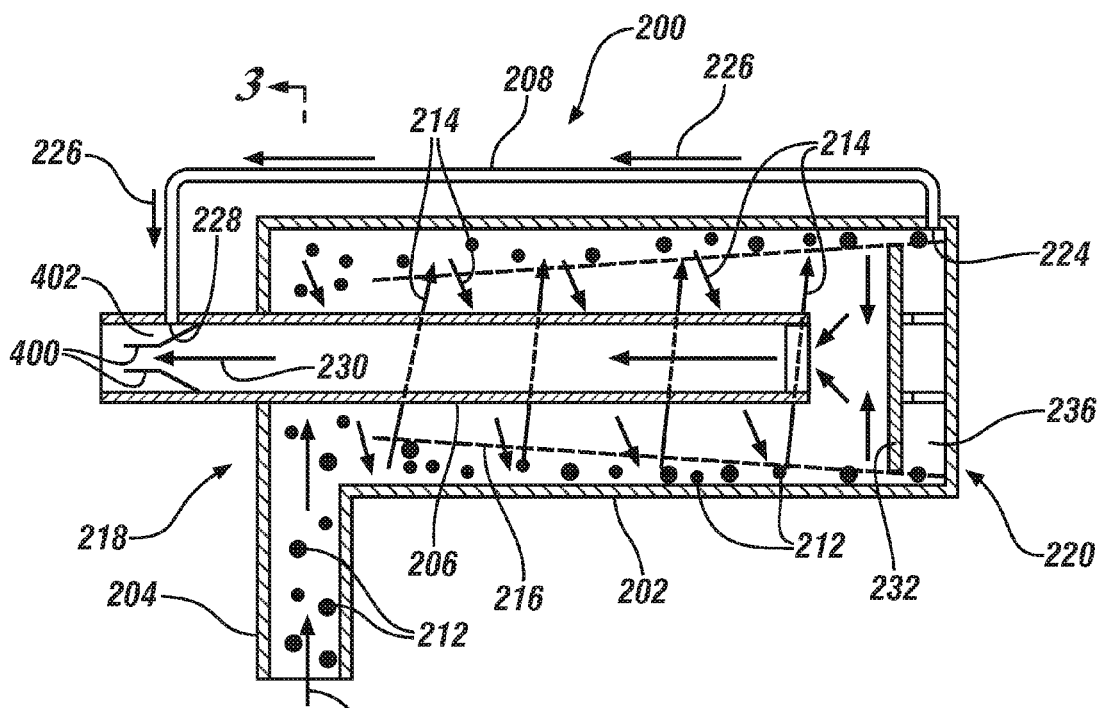
FIG. 4 is a sectional side view of another exemplary fuel separating apparatus.

FIG. 4 shows another embodiment of the ice separating apparatus 200 wherein the flow 226 of water along the conduit 208 is assisted by formation of a low pressure region 402. The low pressure region 402 is formed by the cone 400 or nozzle geometry within the fuel conduit 206. The exemplary cone 400 is an example of a flow control member that has a Venturi geometry to cause the low pressure in region 402. In an embodiment, the fluid pressure proximate inlet 224 of the conduit 208 is higher than the low pressure region 402, thus causing fluid flow 226 into the fuel flow 230. Portions in the ice separating apparatus 200 in FIG. 4 may be substantially similar to those described above in FIGS. 2 and 3. Embodiments of the fuel separating apparatus 200 may use any suitable method for directing melted ice and other fluids into the fuel flow 230, such as passages within the platform 232. The depicted method and apparatus for separating high density matter (e.g. ice, liquid water) from fuel may be utilized for fuel circuits of gas turbines utilized for aerospace or power applications. For example, a gas turbine in a power plant located in a cold climate may utilize the method for separating ice from the fuel flow to improve turbine performance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An ice separating apparatus for a gas turbine engine, the apparatus comprising:
    a can having a first end;
    a tangential inlet proximate the first end of the can to receive a fluid flow within the can, wherein the fluid flow comprises fuel and ice;
    a first conduit within the can to receive a separated fuel flow proximate a second end of the can, wherein the fluid flow separates ice from fuel to form the separated fuel flow, wherein the fluid flows in a helical pattern as it flows from the first end to the second end of the can and wherein ice is separated from fuel by flowing in the helical pattern; and
    a second conduit that enables flow of water from the second end of the can to a first conduit outlet to direct the flow of water into the separated fuel flow, wherein the second conduit is proximate the second end of the can, the first conduit outlet directs the flow of water into the first conduit and the flow of water comprises the ice after it is melted.

2. The apparatus of claim 1, wherein a centrifugal force caused by the fluid flow in the helical pattern causes ice to flow radially towards a wall of the can as the fluid flows axially toward the second end of the can.

3. The apparatus of claim 1, comprising a member proximate the second end of the can, wherein the member creates a circumferential passage between a wall of the can and the member to enable flow proximate the wall to flow toward a wall of the second end of the can.

4. The apparatus of claim 1, wherein a flow control member within the first conduit causes a pressure change proximate the first conduit outlet to draw fluid flow from the second conduit.

5. The apparatus of claim 1, comprising a restrictor in the second conduit to control fluid flow into the first conduit.

6. The apparatus of claim 1, wherein the conduit comprises a cylindrical member.

7. The apparatus of claim 1, wherein the can comprises a cylindrical member.

8. A method for separating ice from fuel in a gas turbine engine, the method comprising:
    flowing a fluid tangentially into a first end of a can, wherein the fluid comprises fuel and ice;
    separating the ice from the fuel by flowing the fluid along a helical pattern as it flows to a second end of the can;
    receiving a separated fuel flow in a first conduit disposed within the can; and directing a water flow from proximate the second end of the can into the separated fuel flow flowing through an outlet of the first conduit, wherein the water flow comprises the ice after it is melted, wherein directing the water flow comprises directing the water flow via an external second conduit providing fluid communication from the second end of the can to the outlet of the first conduit.

9. The method of claim 8, wherein directing the water flow comprises directing the water flow across a restrictor in the external second conduit to control fluid flow into the first conduit.

10. The method of claim 8, separating the ice from the fuel comprises causing ice to flow radially towards a wall of the can as the fluid flows axially toward the second end of the can, wherein the ice flows radially due to a centrifugal force caused by the fluid flow in the helical pattern.

11. The method of claim 8, comprising restricting fluid flow in an axial direction proximate the second end of the can, wherein fluid flow is restricted except for through a circumferential passage between a wall of the can and a member proximate the second end of the can.

12. The method of claim 8, comprising causing a pressure change proximate a first conduit outlet to draw fluid flow from the second conduit.

13. The method of claim 8, wherein flowing the fluid tangentially into the first end of the can comprises flowing the fluid into a cylindrical member.

14. The method of claim 8, wherein receiving a separated fuel flow in a first conduit comprises receiving the separated fuel flow into a cylindrical member.

15. A fuel circuit for a gas turbine engine, the fuel circuit comprising:
    a pump;
    an ice separating apparatus to receive fluid flow from the pump, wherein the ice separating apparatus comprises a tangential inlet proximate a first end of a can to receive the fluid flow within the can, wherein the fluid flow comprises fuel and ice and wherein the fluid flows in a helical pattern as it flows to a second end of the can and wherein a first conduit within the can receives a separated fuel flow, wherein the fluid flow in the helical pattern separates ice from fuel to form the separated fuel flow, wherein the ice forms a liquid water after separation;
    a second conduit proximate the second end of the can, wherein the second conduit directs a flow of liquid water from the second end of the can to a first conduit outlet to direct the flow of liquid water into the separated fuel flow; and;
    a fuel oil cooler to receive the separated fuel flow combined and a liquid water flow from the fuel separating apparatus.

16. The fuel circuit of claim 15, comprising a member proximate the second end of the can, wherein the member creates a circumferential passage between a wall of the can and the member to enable flow proximate the wall to flow toward a wall of the second end of the can.

* * * * *